United States Patent [19]
Goto et al.

[11] Patent Number: 5,582,435
[45] Date of Patent: Dec. 10, 1996

[54] RESIN PIPE PROVIDED WITH RETAINER FITTING

[75] Inventors: Masayuki Goto, Gifu-ken; Masayuki Nakagawa, Aichi-ken, both of Japan

[73] Assignee: Toyoda Gosei Co., Ltd., Aichi-ken, Japan

[21] Appl. No.: 505,846

[22] Filed: Jul. 24, 1995

[30] Foreign Application Priority Data

| Jul. 27, 1994 | [JP] | Japan | 6-175591 |
| Jul. 29, 1994 | [JP] | Japan | 6-177968 |
| Aug. 5, 1994 | [JP] | Japan | 6-184895 |

[51] Int. Cl.⁶ ............................ F16L 33/20
[52] U.S. Cl. .............. 285/238; 285/258; 285/256
[58] Field of Search ............... 285/256, 238–251; 138/109

[56] References Cited

U.S. PATENT DOCUMENTS

| 2,685,458 | 8/1954 | Shaw | 285/246 |
| 3,006,664 | 10/1961 | Appleton et al. | 285/256 |
| 4,335,753 | 6/1982 | Frye | 285/258 |
| 5,295,718 | 3/1994 | Bartholomew | 285/258 |

FOREIGN PATENT DOCUMENTS

| 64-41431 | 3/1989 | Japan . | |
| 2-6624 | 1/1990 | Japan . | |
| 2-299929 | 12/1990 | Japan . | |
| 3-17398 | 2/1991 | Japan . | |
| 3-50525 | 5/1991 | Japan . | |
| 3-117794 | 5/1991 | Japan . | |
| 3-53318 | 5/1991 | Japan . | |
| 3-50524 | 5/1991 | Japan . | |
| 4088285 | 3/1992 | Japan | 285/256 |
| 4254089 | 9/1992 | Japan | 285/256 |
| 566051 | 7/1977 | U.S.S.R. | 285/256 |
| 2065823 | 7/1981 | United Kingdom | 138/109 |

*Primary Examiner*—Eric K. Nicholson
*Attorney, Agent, or Firm*—Cushman Darby & Cushman, L.L.P.

[57] ABSTRACT

A resin pipe provided with a retainer fitting at an end thereof having an open end portion. The open end portion has a small outer diameter portion adjacent the open end which is provided with a seal fixed onto an outer circumferential surface thereof, and a large outer diameter portion extends axially from the small diameter portion on which is provided a crimping groove formed circumferentially on the outer circumferential surface thereof to protect a seal between the retainer fitting from crimping forces. The retainer fitting has an inner cylinder portion, a small-diameter outer cylinder portion extending axially round the opening end from the inner cylinder portion, an enlarged-diameter portion extending outwardly from the small-diameter outer cylinder portion, and a large-diameter outer cylinder portion extending axially from the enlarged-diameter portion so as to cover the outer circumferential surface of the large diameter portion.

12 Claims, 6 Drawing Sheets

RESIN PIPE PROVIDED WITH RETAINER FITTING

FIELD OF THE INVENTION

The present invention relates to a resin pipe provided with a retainer fitting at an open end.

BACKGROUND OF THE INVENTION

Frequently, it is desirable that a conduit, a pipe or a container which has an open end portion made of resin, have that opening capped with a screw-including retainer fitting. This assures a strong connection with another conduit or pipe, as well as a strong connection permitting the fastening of a cap.

Figure 11:
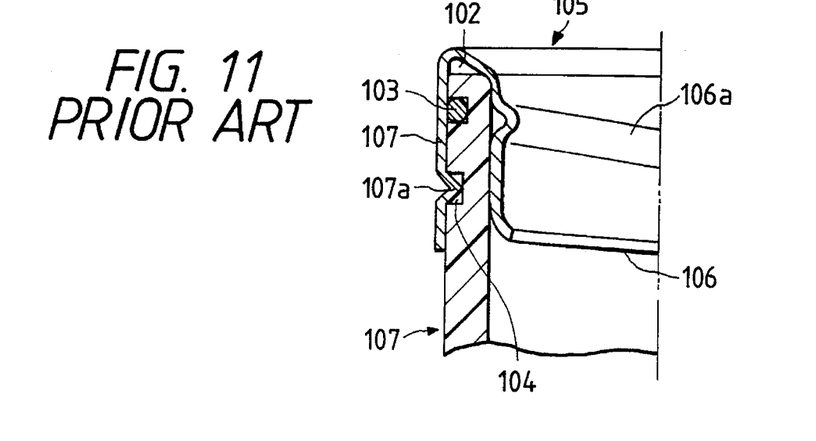
FIG. 11 is sectional view showing a conventional retainer fitting.

A conventional retainer fitting attached onto an open end portion of a resin pipe is shown in FIG. 11. In FIG. 11, reference numeral 101 generally designates an open end portion of a resin pipe. The open end portion 101 includes a ring-like seal 103 fixed onto its outer circumferential surface near an open end 102 and a crimping groove 104 that extends circumferentially about the outer circumferential surface of portion 101 and positioned farther away from end 102 than seal 103.

The retainer fitting, generally indicated at 105, assumes the form of a double pipe structure including an inner cylinder portion 106 covering an inner circumferential surface of the open end portion 101. The inner portion 106 includes a screw-like thread 106a projecting centripetally. Retainer 105 also includes an outer cylinder portion 107 formed integrally with the inner cylinder portion 106 and covering an outer circumferential surface of the open end portion 101 and extending about the open end 102.

After the open end portion 101 is capped with the retainer fitting 105, the seal 103 is pressed centripetally by the outer cylinder portion 107 of the retainer fitting 105 to thereby achieve a hermetic at the location of seal 103. At the same time, a sectionally L-shaped crimping rib 107a is formed in the outer cylinder portion 107 and received in the crimping groove 104 to thereby integrally attach the retainer fitting 105 onto the opening end portion 101.

In the conventional retainer fitting 105, there is however a risk that the inwardly directed force of the outer cylinder portion 107 centripetally pressing against seal 103 may be weakened due to distortion generated in the retainer fitting 105 when the crimping rib 107a is formed. This is because the crimping rib 107a is formed after the open end portion 101 is capped with the retainer fitting 105 in a condition in which the inner cylinder portion 106 and the outer cylinder portion 107 act on each other so that the distance therebetween is reduced.

There is also a risk that the fastening force may be weakened by relaxation of stress of the resin forming the open end portion 101, or the like, especially during long-term use that can result in the rotation of the retainer fitting 105 relative to end portion 101.

Figure 12:
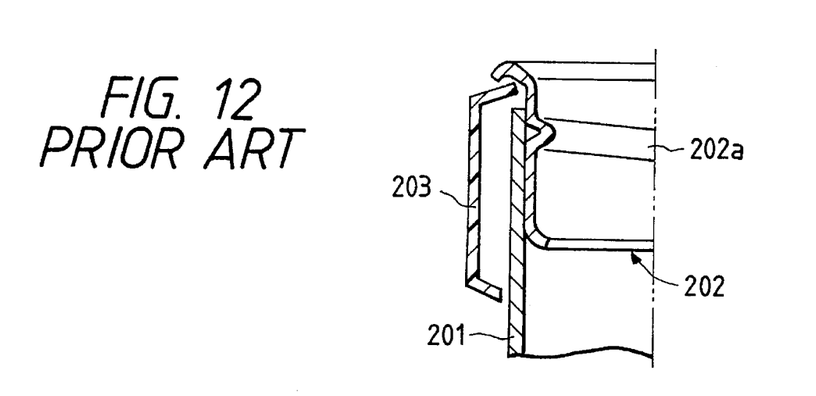
FIG. 12 is a cross-sectional view showing another example of a conventional retainer fitting provided on an opening to a fuel inlet of a fuel tank.

Another example concerns an opening in the form of a fuel inlet for a fuel tank, or the like, as shown in FIG. 12. The retainer fitting 202 again includes a screw-like thread 202a and is attached to the inside of an iron pipe 201 by welding. A resin ring 203 is provided on the outer circumference of the iron pipe 201 for the purpose of sealing between the iron pipe 201 and a body-side inlet box (having a duct in which the fuel inlet portion projects).

Such a configuration is not only complex in structure, because the number of parts is no less than three, but involves a large cost because of the aforementioned welding work.

Figure 13:
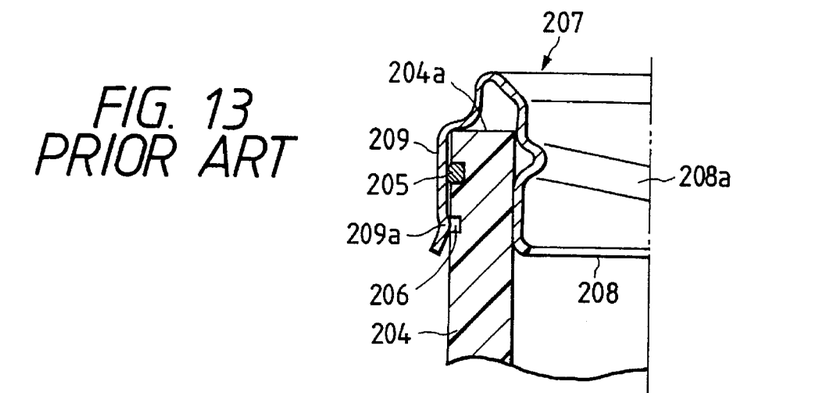
FIG. 13 is a cross-sectional view showing another example of a conventional retainer fitting.

FIG. 13 shows an improved a resin pipe constituted by only two parts where a double tube type retainer fitting is attached to the open end of the resin pipe. In the resin pipe provided with this double tube type retainer fitting, a ring-like seal 205 is fixed on an outer circumferential surface near an open end 204a of the end portion 204, and a Crimping groove 206 is formed circumferentially on an outer circumferential surface further from the open end 204a beyond seal 205.

The retainer fitting 207 assumes the form of a double tube structure comprising an inner cylinder portion 208, covering an inner circumferential surface of the end portion 204 and having a screw-like thread 208a projecting centripetally, and an outer cylinder portion 209 formed integrally with the inner cylinder portion 208 and covering an outer circumferential surface of the end portion 204a round the open end 204a.

After the retainer fitting 207 is attached onto the end portion 204, the seal 205 is pressed centripetally by the outer cylinder portion 209 to thereby achieve a hermetic seal at seal 205. At the same time, a sectionally L-shaped crimping portion 209a is formed by crimping in the outer cylinder portion 209 so that the crimping portion 209a will fit into a crimping groove 206 to thereby integrally attach the retainer fitting 207 onto the end portion 204.

The end portion 204 is formed so that the outer diameter and thickness thereof are both large for the purpose of sealing between the end portion 204 and the body-side inlet box.

It should be understood that the diameter of the duct of the inlet box, the diameter of a cap fitted to the inner cylinder portion and the general size (outer diameter) of the resin pipe are each determined preliminarily because the need for use with existing parts. That is, the gap (through the resin pipe) between the duct of the inlet box and the cap is set to be a fixed size because of existing parts.

Further, because the resin pipe is formed by blow molding, there is a limitation that the thickness of the resin pipe cannot be changed greatly as shown in FIG. 13 and it is virtually impossible that only the end portion can be made thick.

Accordingly, in the case where the double tube type retainer fitting is put on the resin pipe which is formed by blow molding so as to be entirely thin like a filler, it is necessary to fill up the gap between the resin pipe and the inlet box, that is to reduce the gap to thereby bring the gap close to a value in which a sealing material is fitted properly, to thereby secure the sealing characteristics of the fitting.

It is now thought of that the retainer fitting is made to carry out the function of filling up the gap between the resin pipe and the inlet box. In the configuration of this case, after the inner cylinder portion of the retainer fitting is fitted to the inside of the linear resin pipe and a gap is formed between the outer cylinder portion of the retainer fitting and the outer circumferential surface of the resin pipe, the distance between the inlet box and the outer cylinder portion of the retainer fitting is reduced to thereby perform sealing securely.

In the case where the inner cylinder portion of the retainer fitting is fitted to the resin pipe, the state of attachment of the retainer fitting is, however, unstable.

On the other hand, in order to make the resin pipe per se carry out the function of filling up the gap between the resin pipe and the inlet box without an increase of the thickness thereof, it may be thought of that molding is made so that the diameter of the end portion of the resin pipe is enlarged.

In this case, however, there arises a problem that the cap fitted to the inner cylinder portion is unstable.

SUMMARY OF THE INVENTION

It is a first object of the present invention to provide a retainer fitting in which the influence of crimping on a seal can be prevented while the unification characteristic of the retainer fitting attached onto a resin open end portion by crimping is secured.

A second object is to provide a resin pipe with a retainer fitting which is prevented from relative rotation therewith.

A third object is to provide a resin pipe with a retainer fitting constituted by only two parts, that is a thin pipe obtained by blow molding and a double tube type retainer fitting, and to thereby achieve the same sealing characteristic between the pipe and the inlet box and the same stability when attaching a cap as with a pipe having a thick end portion.

In view of the first object, an inner cylinder portion abuts an inner circumferential surface of an open end portion and is reinforced. Further, a thread of the inner cylinder portion is used for connection with another conduit pipe or for attachment of a cap.

A small-diameter outer cylinder portion abuts an outer circumferential surface of the open end portion to which a seal is fixed, and the small-diameter outer cylinder portion presses the seal centripetally to thereby satisfy the hermetic sealing function desired of the seal.

An enlarged-diameter portion extends centrifugally from the small-diameter outer cylinder portion so as to be connected to a large-diameter outer cylinder portion.

The large-diameter outer cylinder portion covers a large diameter portion of the opening end portion and is crimped centripetally so as to be fixed into a crimping groove of the opening end portion.

Accordingly, the small-diameter outer cylinder portion and the large-diameter outer cylinder portion are connected to each other by the enlarged-diameter portion so that stiffness increases in each of portions where they are connected to the enlarged-diameter portion. As a result, distortion generated when the large-diameter outer cylinder portion is circumferentially crimped does not extend to the small-diameter outer cylinder portion. Consequently, any effect of crimping is prevented from effecting the seal while unification of the retainer fitting and the opening end portion is assured.

In view of the second object, as for the resin pipe provided with the retainer according to the present invention, the pipe includes at least one engagement recess portion extending a limited distance around of the outer circumferential surface of the open end portion of the pipe. The engagement recess portion can be formed as a depression within an outer circumferential circle containing the engagement recess portion. Incidentally, a plurality of engagement recess portions may be provided along the outer circumferential circle or over the whole outer circumferential circle. It is, however, necessary that a portion projecting centrifugally compared with each engagement recess portion be provided between adjacent engagement recess portions.

On the other hand, the engagement portion of the retainer which engages with the engagement recess portion of the resin pipe is formed by two slits which extend axially to define the engagement portion. The number of engagement portions included in the retainer may be one or may be not smaller than two. It is however preferably that the number of slits to define the engagement portion is smaller, because the slits serve to weaken crimping force. Each of the slits may be of a single end open type in which the slit is open at an end of the outer cylinder portion or may be of a type in which the slit is closed at both ends.

In the case where a circumferential portion of attachment between the resin pipe and the retainer is defined in an assembly process so that the resin pipe and the retainer are constantly attached to each other at a predetermined portion, the number of the engagement recess portions included in the resin pipe may be one and the number of the engagement portions included in the retainer may be also one. In the case where the circumferential portion of attachment between the resin pipe and the retainer rotates to change relatively to each change, it is however preferable that the engagement recess portion be formed over the whole outer circumferential circle. It is further preferable that several of engagement portions be included in the retainer at intervals of a pitch different from the pitch for the arrangement of the engagement recess portions so that at least one engagement potion and at least one recess portion can engage with each other in any condition for relative rotation.

In the resin pipe provided with the retainer according to the present invention, the engagement portion of the retainer is made to enter into the engagement recess portion provided in the outer circumferential surface of the open end portion of the resin pipe and is fixed into the engagement recess portion by crimping. Accordingly, the resin pipe and the retainer cannot thereafter rotate relatively, so that the retainer can be prevented from rotating.

In view of the third object, the resin pipe includes a small-diameter open end portion, and a large-diameter center portion connected axially to the open end portion. The open end portion and the center portion can be formed to the same thickness by blow molding.

The inner cylinder portion in the retainer fitting abuts on the inner circumferential surface of the open end portion. A screw thread thereof is used for connection to another conduit pipe or for attachment of a cap.

The small-diameter outer cylinder portion partly abuts the inner circumferential surface of the open end portion thereby reinforcing the open end portion.

The enlarged-diameter portion extends centrifugally from the small-diameter outer cylinder portion so as to be connected to the large-diameter outer cylinder portion.

The large-diameter outer cylinder portion abuts the center portion of the resin pipe and covers the outer circumferential surface of the center portion.

Accordingly, not only does the center portion of the resin pipe fill the gap between the pipe and the duct of the inlet box so that the sealing characteristic between the pipe and the inlet box can be assured, but the large-diameter outer cylinder portion of the retainer also abuts the center portion of the resin pipe so that the retainer fitting is attached to the resin pipe in a stable manner.

Further, the inner cylinder portion of the retainer fitting abuts the open end portion of the resin pipe and is reinforced by the open end portion, so that another resin pipe or a cap can be attached to the inner cylinder portion stably.

Furthermore, the axial length of the small-diameter outer cylinder portion extending from the open end is smaller than the axial length of the inner cylinder portion, so that the axial length of the inner cylinder portion, that is, the quantity of attachment of the other resin pipe or cap can be increased.

DETAILED DESCRIPTION OF THE PREFERRED EMBODIMENTS

1st Embodiment

A retainer fitting according to a first embodiment of the present invention will be described below in detail with reference to FIGS. 1 and 2.

Figure 1:
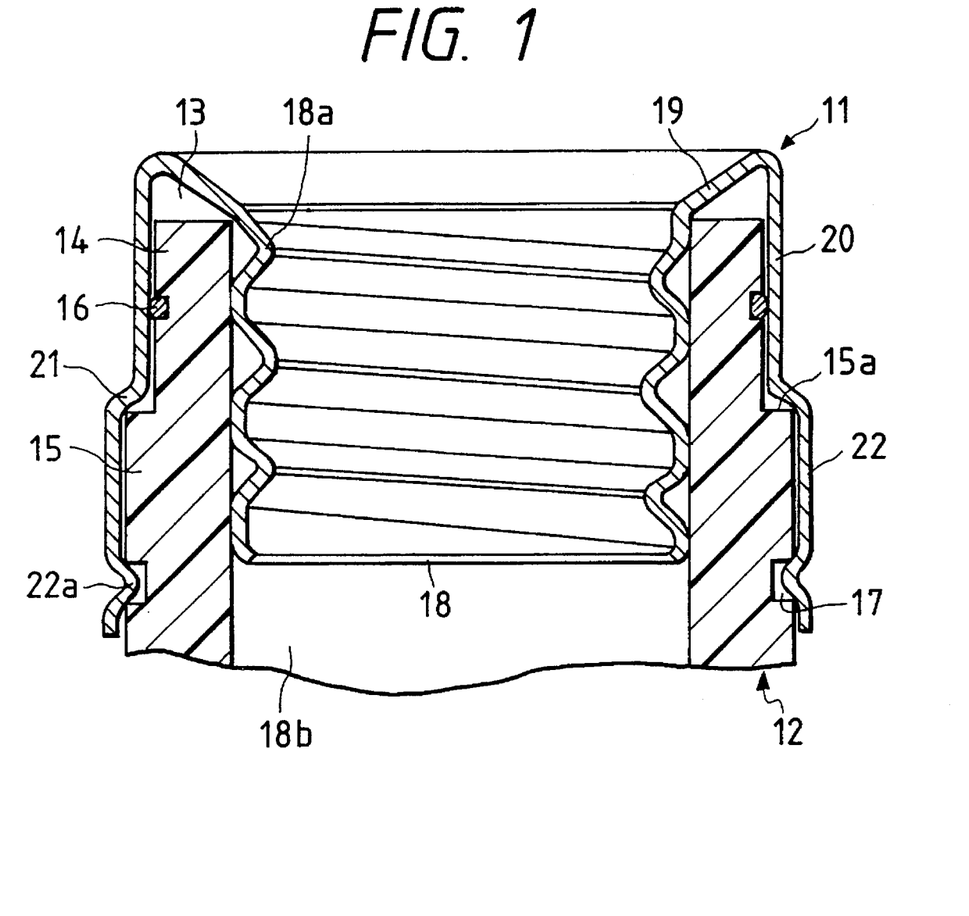
FIG. 1 is a cross-sectional view showing a retainer fitting according to a first embodiment of the present invention.

As shown in FIG. 1, an open end portion 12 of a tubular structure, formed from a resin has a retainer fitting 11 attached thereto. Fitting 11 includes a small outer diameter portion 14 adjacent an open end 13, and a large outer diameter portion 15 extending axially away from the small diameter portion 14.

A ring-like seal 16 of rubber, or the like, is fixed into a groove formed in the outer circumferential surface of the small diameter portion 14. Seal 16 projects centrifugally from the outer circumferential surface of the small diameter portion 14 before attachment of the retainer fitting 11.

A crimping groove 17 is formed circumferentially in an outer circumferential surface of the large diameter portion 15.

The retainer fitting 11 used to cover the open end portion 12 comprises an inner cylinder portion 18 abutting on an inner circumferential surface 186 of the open end portion 12, a turned portion 19 at which the inner cylinder portion 18 turns back to the outside around the open end 13 of the open end portion 12. The fitting 11 also includes a small-diameter outer cylinder portion 20, extending axially from the turned portion 19 while abutting the outer circumferential surface of the small diameter portion 14, an enlarged-diameter portion 21, extending outwardly from the small-diameter outer cylinder portion 20 so as to correspond to a shoulder portion 15a of the large diameter portion 15, and a large-diameter outer cylinder portion 22 extending further axially away from the enlarged-diameter portion 21 and covering the outer circumferential surface of the large diameter portion 15.

The inner cylinder portion 18 has a screw-like thread 18a projecting centripetally, so that when an element corresponding to the thread 18a is formed in another conduit pipe or cap, connection with the other conduit pipe or attachment of the cap can be made firmly.

The turned portion 19 is curved to correspond to the width of the tubular wall of the open end 13 so as to be roughly U-shaped while a slight gap is kept between the turned portion 19 and the open end 13.

Because the inner diameter of the small-diameter outer cylinder portion 20 is set so that the small-diameter outer cylinder portion 20 abuts the outer circumferential surface of the small diameter portion 14, the seal 16 projecting from the outer circumferential surface of the small diameter portion 14 is pressed by the small-diameter outer cylinder portion 20 to provide a seal therebetween.

The enlarged-diameter portion 21 connects the small-diameter outer cylinder portion 20 and the large-diameter outer cylinder portion 22 to form a nearly S shape in section. In this embodiment, the enlarged-diameter portion 21 assumes a taper like a part of a cone inclined slightly obliquely with respect to the horizontal shoulder portion 15a of the large diameter portion 15.

As for the large-diameter outer cylinder portion 22, a U-shaped crimping portion 22a is formed after the retainer fitting 11 is installed over the open end portion 12. The crimped portion 22a is fixed into a groove 17 formed in the large diameter portion 15. As a result, the retainer fitting 11 is attached onto the opening end portion 12 integrally with the opening end portion 12.

Accordingly, in the retainer fitting 11 configured as described above, the enlarged-diameter portion 21 is interposed between the small-diameter outer cylinder portion 20 and the large-diameter outer cylinder portion 22. Thus, the small-diameter outer cylinder portion 20, the enlarged-diameter portion 21 and the large-diameter outer cylinder portion 22 collectively form a two-stage cylinder structure in which the cylinder of the small-diameter outer cylinder portion 20 and the cylinder of the large-diameter outer cylinder portion 22 are connected to each other. Stiffness increases in each of portions where the respective cylinders 20 and 22 are connected by the enlarged-diameter portion 21. Hence, any distortion generated when the large-diameter outer cylinder portion 22 is crimped to form the crimped portion 22a does not extend upwardly to the small-diameter outer cylinder portion 20.

Accordingly, the force of the small-diameter outer cylinder 20 pressing the seal 16 is prevented from being weakened by the force generated at the time of the formation of the crimped portion 22a, so that the compression ratio set initially for the seal 16 can be secured without any subsequent influence of crimping.

Figure 2A:
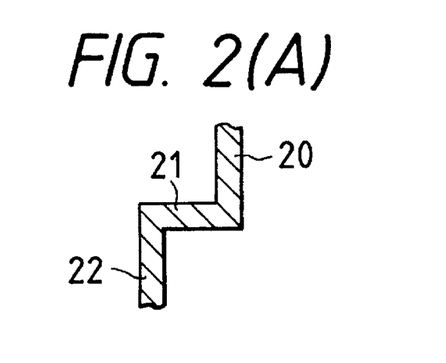
FIGS. 2(A) and 2(B) are cross-sectional views for explaining the shape of the enlarged-diameter portion in a retainer fitting according to the first embodiment of the present invention.
Figure 2B:
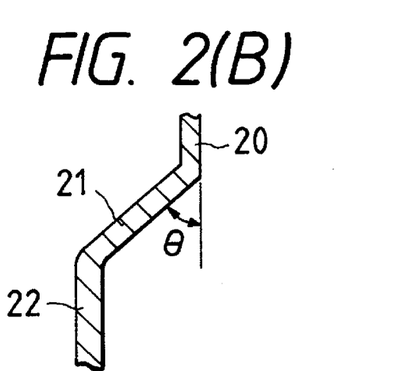

The angle at which the enlarged-diameter portion 21 connects the small-diameter outer cylinder portion 20 and the large-diameter outer cylinder portion 22, that is, the solid angle of the cone obtained by connecting the enlarged-diameter portion 21 to the apex thereof,-has an arbitrary value ranging from about 180°, in the case where the small-diameter outer cylinder portion 20 and the large-diameter outer cylinder portion 22 are connected at right angles, as in FIG. 2A, to about 2θ in the case where they are connected at a certain angle θ, as shown in FIG. 2B.

Further, the enlarged-diameter portion 21 is not limited to the case where it forms a linear conical surface, but the same effect can be obtained where the enlarged-diameter portion 21 forms a roughly curved surface.

As described above with respect to the first embodiment, the retainer fitting has a two-stage cylinder structure constituted by the small-diameter and large-diameter portions, with stiffness increasing relatively to each other in the vicinity where the respective portions are connected to the enlarged-diameter portion. Accordingly, even where the large-diameter outer cylinder portion is distorted by crimping, the distortion thereof is prevented from being transmitted to the small-diameter outer cylinder portion. As a result, the compression ratio set initially for the seal can be maintained without any influence of crimping while the unification of the retainer fitting and the open end portion is secured.

2nd Embodiment

Figure 3:
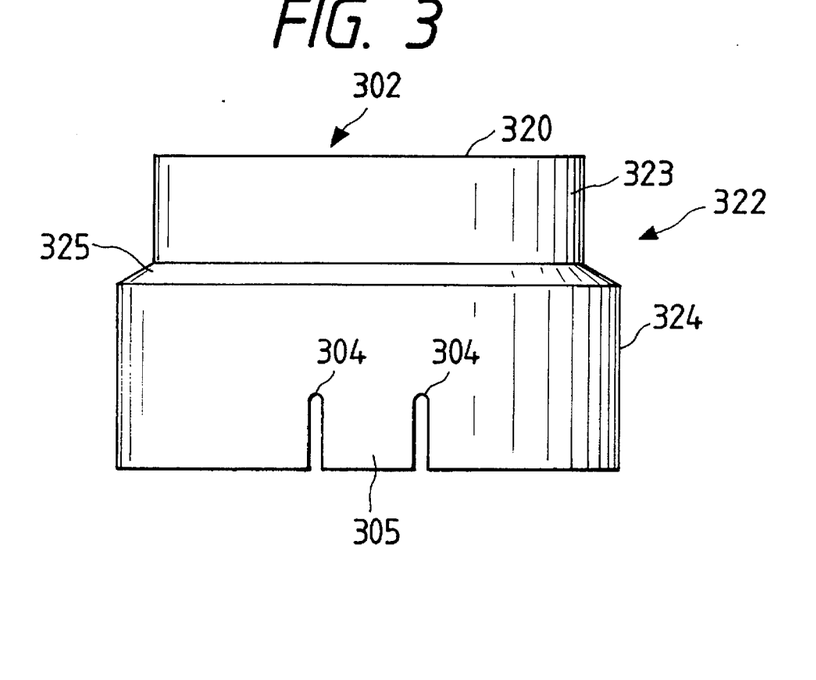
FIG. 3 is a side elevational view of a retainer of a second embodiment of the present invention.
Figure 4:
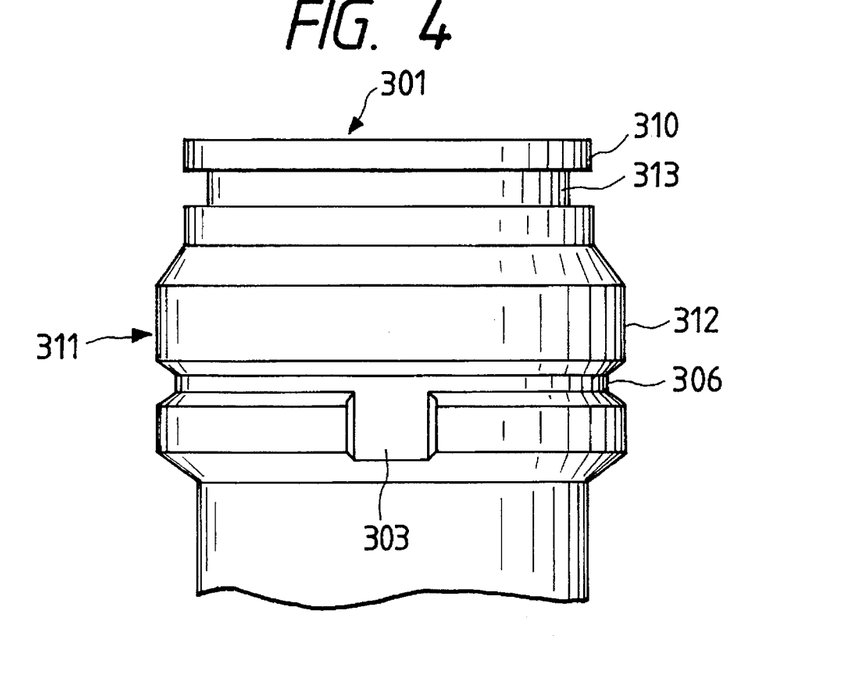
FIG. 4 is a side elevational view of a resin pipe in the second embodiment of the present invention.
Figure 5:
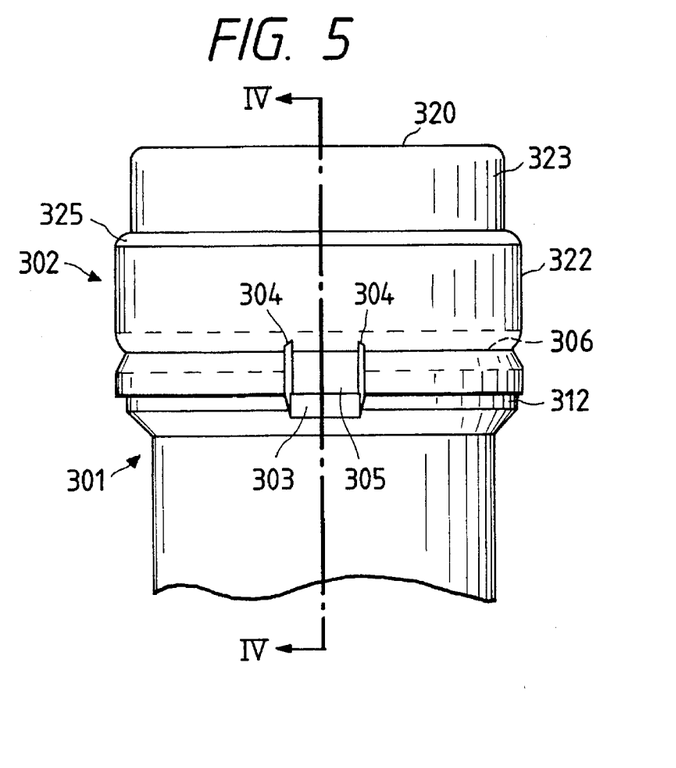
FIG. 5 is a side elevational view of the resin pipe provided with the retainer in the second embodiment of the present invention.
Figure 6:
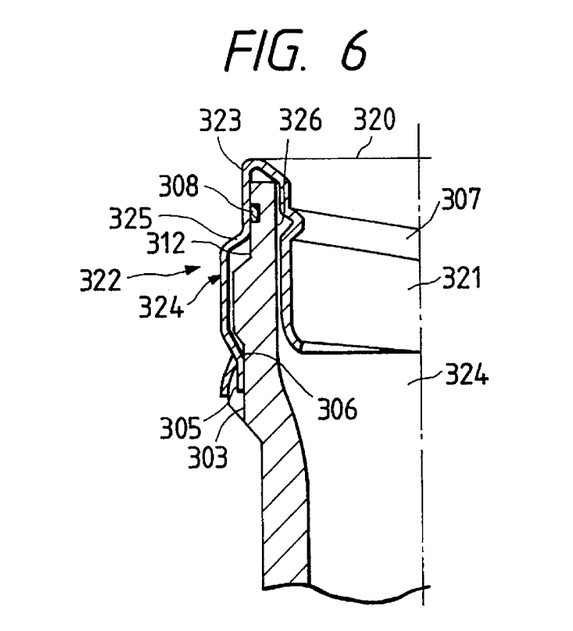
FIG. 6 is a cross-sectional view showing the connection between the retainer and the resin pipe in the second embodiment of the present invention.

With reference now to FIGS. 3–6, resin pipe 301 is provided with a retainer generally indicated at 302. As shown in FIGS. 3 and 6, this retainer 302 includes an inner cylinder portion 321 (shown in FIG. 6), a turned portion 320 formed integrally with the inner cylinder portion 321, and an outer cylinder portion 322 formed integrally with the turned portion 320. A ring-like groove is formed between the inner cylinder portion 321 and the outer cylinder portion 322 so that an open end portion of the resin pipe 301 can be inserted and fixed into this groove.

As shown in FIG. 3, the outer cylinder portion 322 of the retainer 302 is composed of a small outer diameter front end portion 323 and a large outer diameter rear end portion 324 connected to the small-diameter front end portion 323 by a step portion 325. Two slits 304, 304 are provided in the large-diameter rear end portion 324 so that the two slits 304, 304 extend axially with a slight circumferential separation therebetween. An intermediate portion partitioned by the two slits 304, 304 forms an engagement portion 305 of the present invention.

Further, the inner cylinder portion 321 is provided with an inwardly projecting rib 307 forming a screw thread that extends both circumferentially and helically.

The resin pipe 301 as shown in FIG. 4 and in FIG. 6 includes an outer circumferential surface, generally indicated at 311, that includes a variety of diameters. Like the outer cylinder portion 322 of the retainer, the outer circumferential surface 311 is composed of a small-diameter front end portion 310, and an enlarged-diameter base portion 312. A circumferentially extending seal groove 313 is formed in the front end portion 310 in order to hold an O-ring 308. A crimping groove 306, which also extends circumferentially, is formed in the base portion 312. One of portions which projects radially outwardly to thereby define the bottom of the crimping groove 306 is partly cut away in an axial direction to form an engagement recess portion 303 as shown in FIG. 4.

The outer surface 311 of the resin pipe 301 includes O-ring 308 inserted into the ring-like groove 313 and the outer surface 311 is then covered with the retainer 302. The inner cylinder portion 321 of retainer 302 will abut an inner circumferential surface 326 of the pipe 301, whereas the outer cylinder portion 322 covers the outer circumferential surface 311 and abuts on the O-ring 308 to thereby seal the outer circumferential surface of the opening end portion 311 and the inner circumferential surface of the outer cylinder portion of the retainer 302.

In this state, crimping occurs along the outer circumferential circle, inclusive of the engagement portion 305, of the outer cylinder portion 322. A portion thus crimped is reduced in size annularly so that the crimped portion is forced and fixed into groove 306. Then, the engagement portion 305 is pressed down centripetally, so that the engagement portion 305 is fixed into the engagement recess portion 303. This condition is shown in FIGS. 5 and 6.

The resin pipe provided with the retainer in the second embodiment has the aforementioned configuration.

In the resin pipe provided with the retainer, the outer cylinder portion 322 of the retainer 302 is crimped annularly so as to be fitted and fixed into the crimping groove 306. Accordingly, there is no disadvantage such as backlash between the retainer 302 and the resin pipe 301, or the like.

Further, the engagement portion 305 of the retainer 302 is fixed into the engagement recess portion 3 of the resin pipe 301. Accordingly, when the retainer 302 and the resin pipe 301 try to rotate relative to one another, such relative rotation is prevented because a circumferential side end of the engagement portion 305 of the retainer 302 abuts on a circumferential wall which defines the engagement recess portion 303 of the resin pipe 301. As a result, the retainer 302 and the resin pipe 301 cannot rotate relatively. Accordingly, the retainer 302 will not rotate relative to the resin pipe 301 even where a rotating force acts on the retainer 302 such as when a screw cap for blocking the opening end of the retainer 302 is attached to or detached from the opening end.

3rd Embodiment

Figure 7:
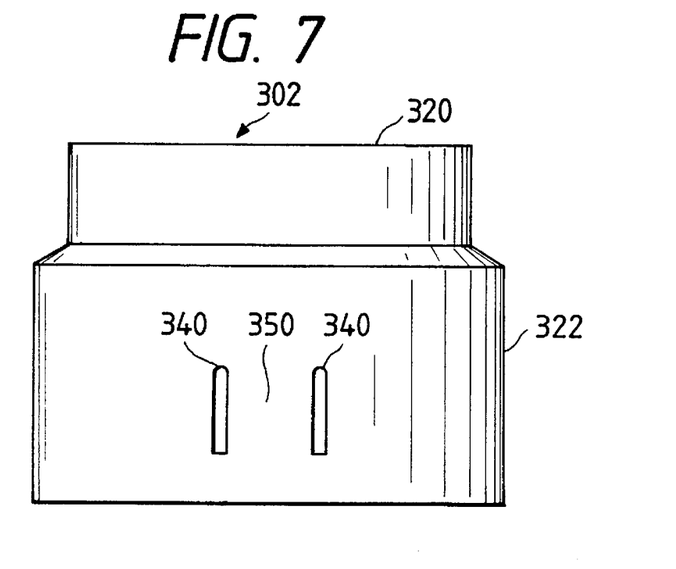
FIG. 7 is a side elevational view of a retainer for a third embodiment of the present invention.
Figure 8:
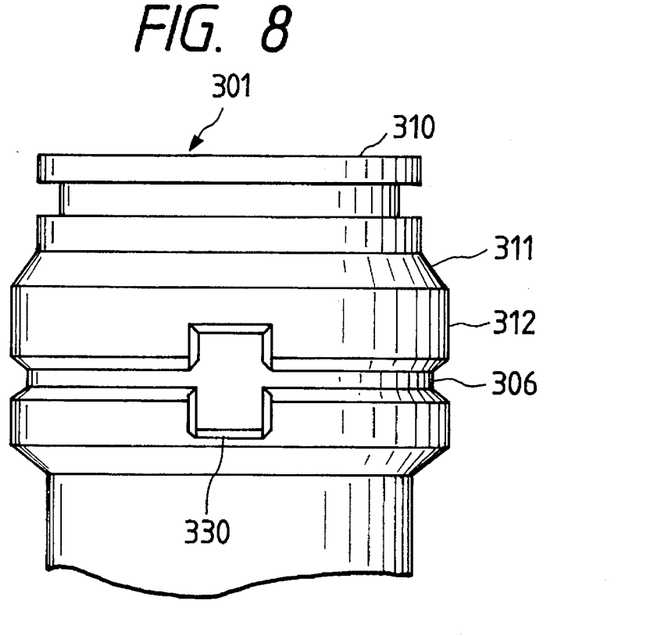
FIG. 8 is a side elevational view of a resin pipe for the third embodiment of the present invention.

A resin pipe provided with a retainer according to a third embodiment of the present invention is shown in FIGS. 7 and 8. The resin pipe 301 provided with the retainer 302 in the third embodiment is the same as that in the second embodiment except that they are different from each other in the engagement portion and the engagement recess portion.

As shown in FIG. 7, the engagement portion 350 in this embodiment is formed between two slits 340, 340 each having closed opposite ends. The engagement recess portion 330, shown in FIG. 8, is shaped like a quadrilateral cavity which is formed by cutting away axially opposite side portions of the crimping groove 306.

The retainer 302 having the engagement portion 350 is put on the open end portion of resin pipe 301 having the engagement recess portion 330 and then the outer cylinder portion 322 of the retainer 302 is crimped along the outer circumferential surface containing the engagement portion 350. The thus crimped portion is reduced in size so as to be fitted and fixed into the groove 306 of the resin pipe 301. On the other hand, because the engagement portion 330 is separated from the other crimped portion by the slits 340, 340, and because the engagement recess portion 330 is provided as an axially spread recess portion, the engagement portion 350 is pressed down axially, along a fairly wide circumferential distance, so as to enter into the engagement recess portion 330. Accordingly, when the retainer 302 and the resin pipe 301 try to rotate relatively, relative rotation is prevented because a circumferential side end of the engagement portion 350 of the retainer 302 abuts a circumferential wall which defines the engagement recess portion 330 of the resin pipe 301.

4th Embodiment

A fourth embodiment of the present invention will be described below in detail with reference to FIG. 9

Figure 9:
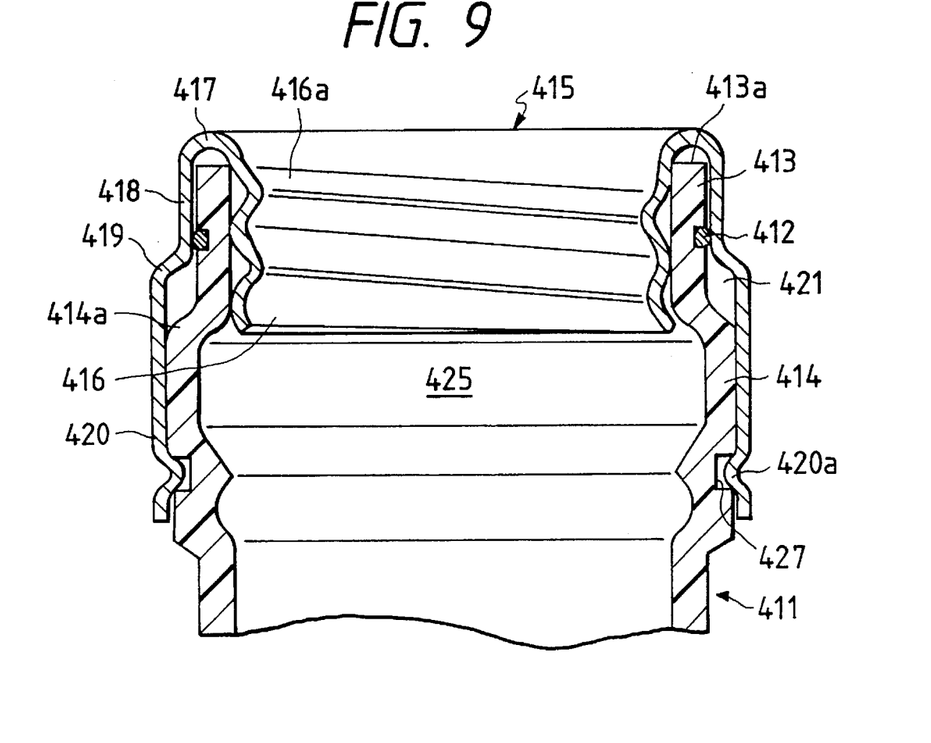
FIG. 9 is a cross-sectional view of a resin pipe provided with a retainer fitting according to a fourth embodiment of the present invention.

FIG. 9 shows a resin pipe 411 provided with a retainer fitting, generally indicated at 415, according to the fourth embodiment of the present invention. As shown in FIG. 9, the resin pipe 411 includes an open end portion 413 having a ring-like seal 412 provided on an outer circumferential surface, and a center portion 414 extending axially away from the open end portion 413. The open end portion 413 and the center portion 414 are formed, for example, by blow molding integrally into one thin body so that the inner diameter and outer diameter of the center portion 414 are larger than those of the open end portion 413. Further, the seal 412 projects centrifugally or radially out from the outer circumferential surface of the open end portion 413 before the retainer fitting 415 is put on the resin pipe 411.

The retainer fitting 415 is put on the resin pipe 411 over the open end portion 413 and the center portion 414. The retainer fitting 415 includes an inner cylinder portion 416 abutting the inner circumferential surface 425, and a turned portion 417 at which the inner cylinder portion 416 turns to the outside around the open end 413a of the open end portion 413. The retainer fitting 415 also includes a small-diameter outer cylinder portion 418, extending axially from the turned portion 417 and abutting on the outer circumferential surface of the opening end portion 413, an enlarged-diameter portion 419 extending centrifugally from the small-diameter outer cylinder portion 418, corresponding to a shoulder portion 414a in which the outer diameter of the center portion 414 is increased, and a large-diameter outer cylinder portion 420 extending further axially away from the enlarged-diameter portion 419 and covering the outer circumferential surface of the center portion 414.

The aforementioned inner cylinder portion 416 has a screw-like thread 416a projecting centripetally, so that when an element corresponding to the thread 416a is formed in another conduit pipe or cap, connection with the other conduit pipe or attachment of the cap can be firmly made.

The axial length of the small-diameter outer cylinder portion 418 is set to be smaller than that of the open end portion 413. The large-diameter outer cylinder portion 420 extends to the open end portion 413 side so that a space 421 is formed centripetally between the large-diameter outer cylinder portion 420 and the outer circumferential surface of the open end portion 413.

Further, because the inner diameter of the small-diameter outer cylinder portion 418 is set so that it abuts the outer circumferential surface of the open end portion 413, the small-diameter outer cylinder portion 418 centripetally presses against seal 412 to thereby satisfy the hermetic sealing function desired of seal 412.

The enlarged-diameter portion 419 connects the small-diameter outer cylinder portion 418 and the large-diameter outer cylinder portion 420 to form a nearly S shape in section. In this embodiment, the enlarged-diameter portion 419 assumes a taper like a part of a cone inclined in a manner corresponding to the shoulder portion 414a where the outer diameter of the open end portion 413 is increased.

As for the large-diameter outer cylinder portion 420, a sectionally U-shaped crimping portion 420a is formed after the retainer fitting 415 is put on the open end portion 413. The crimping portion 420a is fixed into a groove 427 formed in the outer circumferential surface of the center portion 414. As a result, the retainer fitting 415 is integrally attached onto the resin pipe 411.

Accordingly, in the resin pipe provided with the retainer fitting configured as described above for the fourth embodiment, after the small-diameter outer cylinder portion 418 of the retainer fitting 415 abuts the small-diameter open end portion 413 of the resin pipe 411, the enlarged-diameter portion 419 is freed from the opening end portion 413 and then the large-diameter outer cylinder portion 420 abuts the center portion 414 having a larger diameter than that of the open end portion 413 again. Accordingly, the large-diameter outer cylinder portion 420 is backed up by the center portion 414 so that the retainer fitting 415 can be securely installed on the resin pipe 411.

Further, the center portion 414 of the resin pipe 411 fills the gap between the pipe 411 and the duct of the inlet box thereby assuring as good a seal characteristic for the duct of the inlet box as in the case where the resin pipe 411 was thick.

Further, since the inner cylinder portion 416 of the retainer fitting 415 abuts the open end portion 413 having the same diameter as the general size of the resin pipe 411, the inner cylinder portion 416 is reinforced by the open end portion 413 to permit a stable connection in the attachment of a cap.

Above all, in this fourth embodiment, the axial length of the small-diameter outer cylinder portion 418, extending from the open end 413a, is smaller than the axial length of the inner cylinder portion 416, so that the axial length of the inner cylinder portion 416 can be set to be considerably large, that is, the open end portion 413 can be made long axially. Accordingly, the inner circumferential surface of the open end portion 413 on which the inner cylinder portion 416 of the retainer fitting 415 abuts can be set to be long axially, so that the contact area of the inner cylinder portion 416 can be set to be large. This improves the stability of an attached cap.

5th Embodiment

Figure 10:
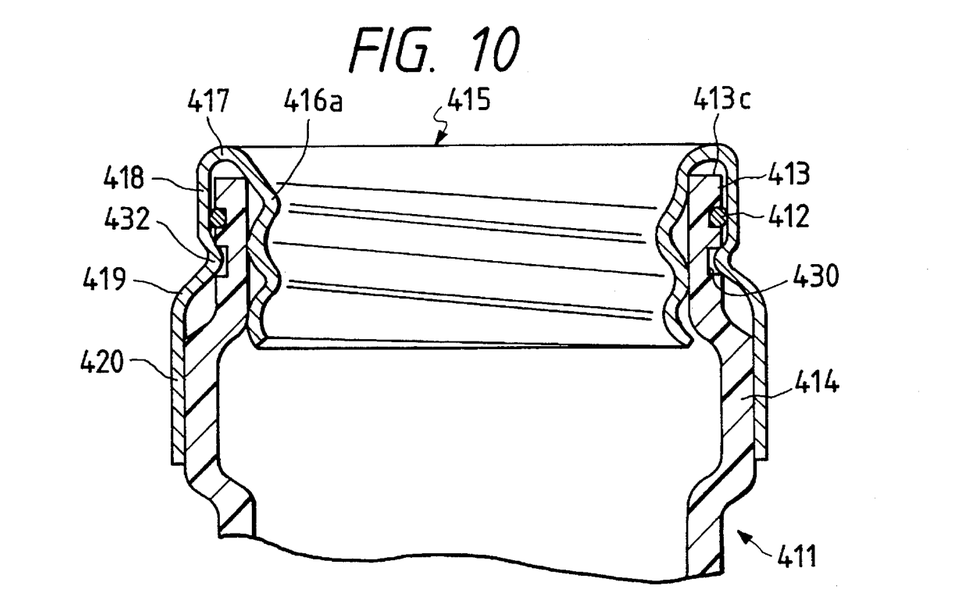
FIG. 10 is a cross-sectional view of a resin pipe provided with a retainer fitting according to a fifth embodiment of the present invention.

FIG. 10 shows a fifth embodiment of the present invention. In the following description, elements common to FIGS. 9 and 10 are supplied with like reference characters.

The resin pipe 411 provided with the retainer fitting according to the fifth embodiment is the same as that according to the fourth embodiment, except that the position of groove 430 has been moved toward the distal end 413c of the open end portion 413 and a crimping portion 432 is formed to be forced into the groove 430. This position for the crimped portion provides the same stiffness as in the case where the resin pipe 411 was thick, but also the effect on the change or variation of the sealing position between the pipe and the inlet box is the same.

Further, both of the aforementioned fourth and fifth embodiments can be configured using only two parts, that is, a double tube type retainer fitting and a resin pipe, so that welding is not required. In cooperation with the easiness of production that the resin pipe can be formed by blow molding, the effect contributing to reduction in production cost is very large.

Further, in both of the aforementioned embodiments the small-diameter outer cylinder portion 418 and the large-diameter outer cylinder portion 420 in the retainer fitting 415 are connected by the enlarged-diameter portion 419 to thereby form an S shape in section. Accordingly, because of the high stiffness of the enlarged-diameter portion 419, not only the small-diameter outer cylinder portion 418 can be made to abut the outer circumferential surface of the opening end portion 413 but also the seal 412 can be provided on the outer circumference of the open end portion 413. Further, crimping may be made in the vicinity of the seal 412 as in the fifth embodiment.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A resin pipe provided with a retainer fitting comprising:
   (A) said pipe having an open end portion comprised of:
      a small diameter portion near an open end thereof, a ringed seal being fixed on an outer circumferential surface thereof; and
      a large diameter portion formed integrally with said small diameter portion and positioned axially from said open end;
   (B) a retainer fitting made of metal having:
      an inner cylinder portion covering an inner circumferential surface of said small diameter portion;
      a turned portion formed integrally with said inner cylinder portion so as to cover an end surface of said open end portion;
      a small-diameter outer cylinder portion formed integrally with said turned portion so as to cover on an outer circumferential surface of said small diameter portion;
      an enlarged-diameter portion formed integrally with and extending outwardly from said small-diameter outer cylinder portion; and
      a large-diameter outer cylinder portion formed integrally with said enlarged-diameter portion so as to cover said large diameter portion; and
   (C) means for fixing said retainer fitting to said open end portion,
      wherein at least one engagement recess portion extends about an outer circumferential surface of said large diameter portion and at least one engagement portion corresponding to said engagement recess portion is formed on said large-diameter outer cylinder portion, and
   wherein said engagement portion comprises an intermediate portion partitioned by two slits formed so as to extend axially on opposite sides of said intermediate portion.

2. A resin pipe provided with a retainer fitting according to claim 1, wherein said fixing means comprises:
   a crimping groove formed circumferentially in an outer circumferential surface of said open end portion; and
   a crimping portion formed circumferentially in said retainer fitting corresponding to said crimping groove so as to engage said crimping groove.

3. A resin pipe provided with a retainer fitting according to claim 2, wherein said crimping groove is formed circumferentially in the outer circumferential surface of said small diameter portion farther away from the open end surface than a position wherein the ringed seal is fixed.

4. A resin pipe provided with a retainer fitting according to claim 2, wherein said crimping groove is formed circumferentially in an outer circumferential surface of said large diameter portion.

5. A resin pipe provided with a retainer fitting according to claim 1, wherein an axial length of said small-diameter outer cylinder portion is smaller than the axial length of said inner cylinder portion.

6. A resin pipe provided with a retainer fitting according to claim 1, wherein said inner cylinder portion further includes a screw thread extending therearound, said thread being constructed and arranged to engage corresponding threads of another member to join the resin pipe to said another member.

7. A resin pipe provided with a retainer fitting according to claim 1, wherein said enlarged-diameter portion is formed integrally with said small-diameter outer cylinder portion at an angle ranging from about 90 degrees to 180 degrees.

8. A resin pipe provided with a retainer fitting according to claim 1, wherein said slits are formed in a rear end portion of said large-diameter outer cylinder portion so that one end of-each of said slits is opened.

9. A resin pipe provided with a retainer fitting according to claim 1, wherein said slits are spaced away from a rear end of said large-diameter outer cylinder portion.

10. A resin pipe provided with a retainer to an open end portion of the resin pipe comprising:
    a resin pipe having at least one engagement recess portion formed on an outer circumferential surface of said open end portion;
    a retainer attached to said open end portion, said retainer including an inner cylinder portion covering an inner circumferential surface of the open end portion, a turned portion formed integrally with said inner cylinder portion so as to cover an open end surface of said open end portion, and an outer cylinder portion formed integrally with said turned portion so as to cover an outer circumferential surface of said open end portion, said outer cylinder portion having at least one engagement portion corresponding to said at least one engagement recess portion;
    wherein said retainer is crimped about said outer cylinder portion and said at least one engagement portion is engaged into said at least one engagement recess portion, and
    wherein said at least one engagement portion is an intermediate portion partitioned by two slits formed so as to extend axially on opposite sides thereof.

11. A resin pipe provided with a retainer fitting according to claim 10, wherein said slits are formed in a rear end portion of said outer cylinder portion so that one end of each of said the slits is open.

12. A resin pipe provided with a retainer fitting according to claim 10, wherein said slits are spaced from a rear end of said large-diameter outer cylinder portion.

* * * * *